UNITED STATES PATENT OFFICE.

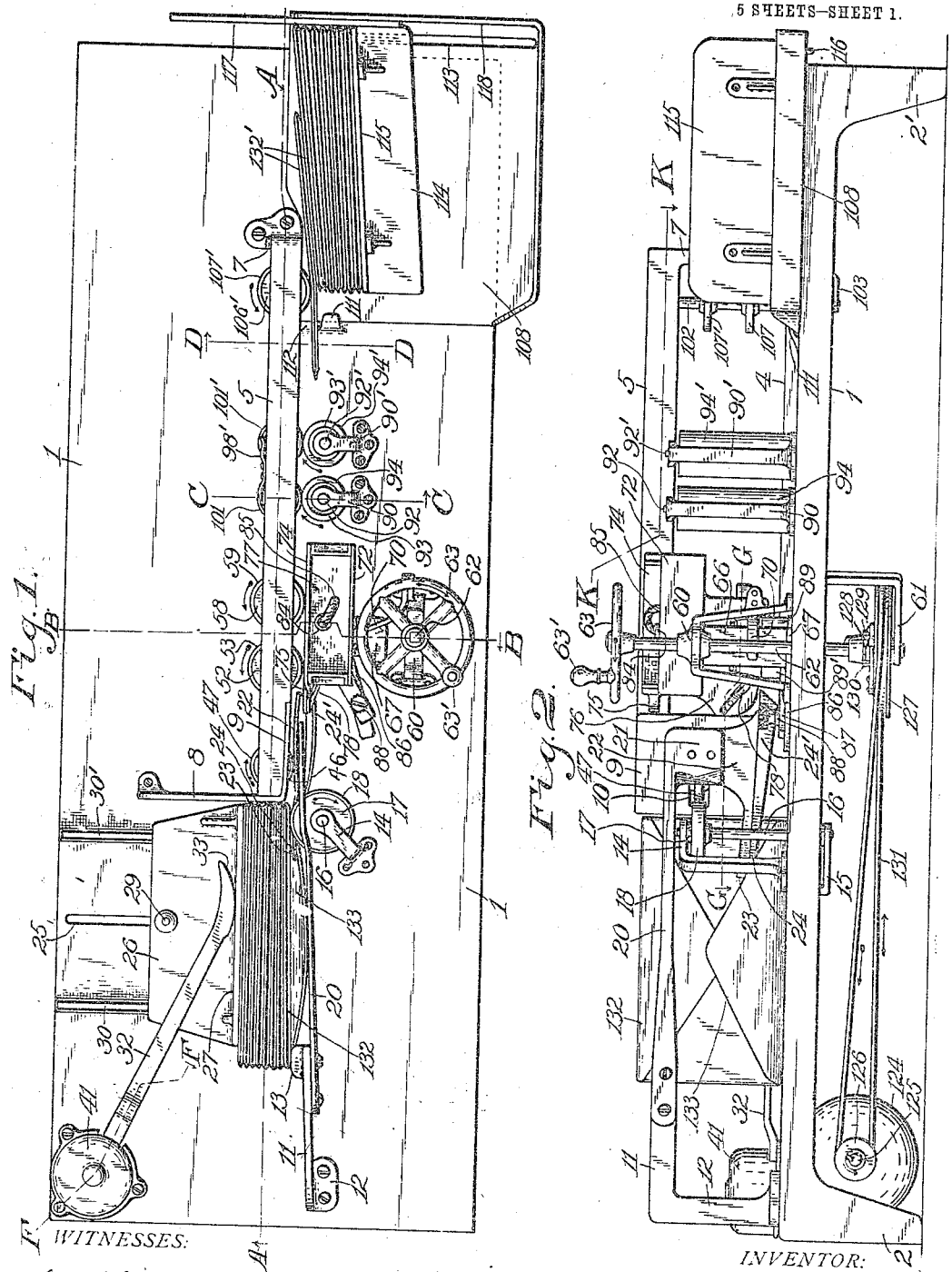

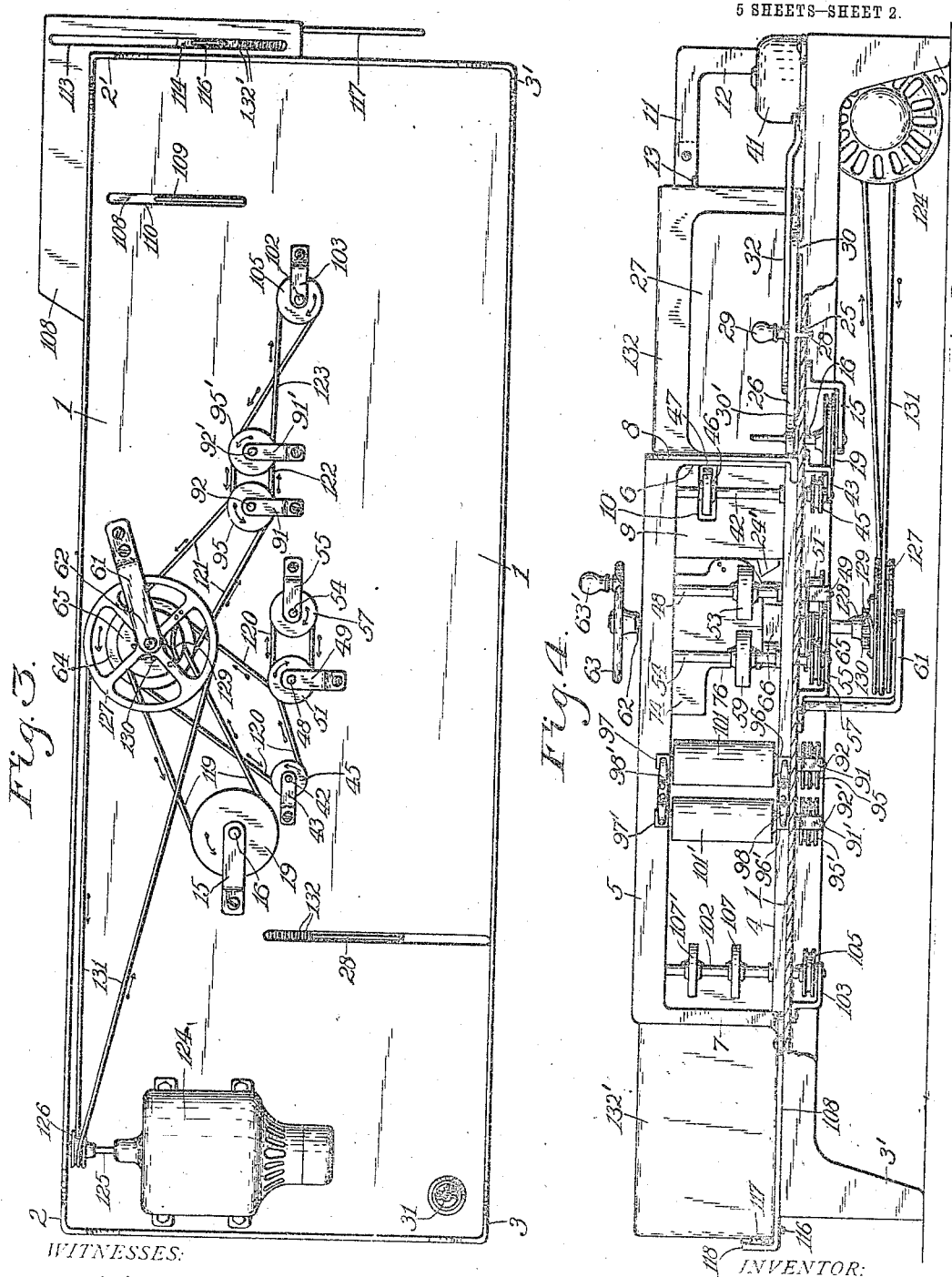

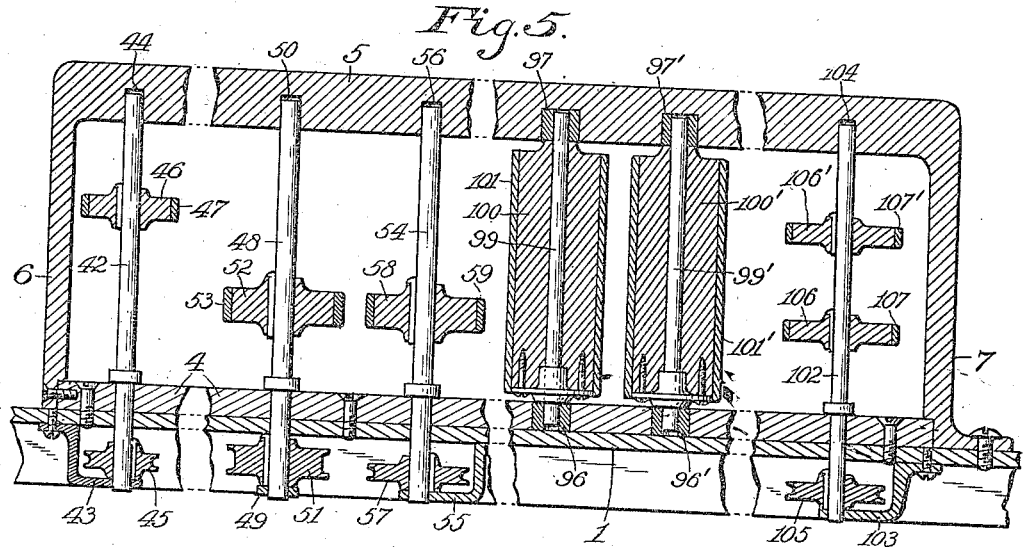
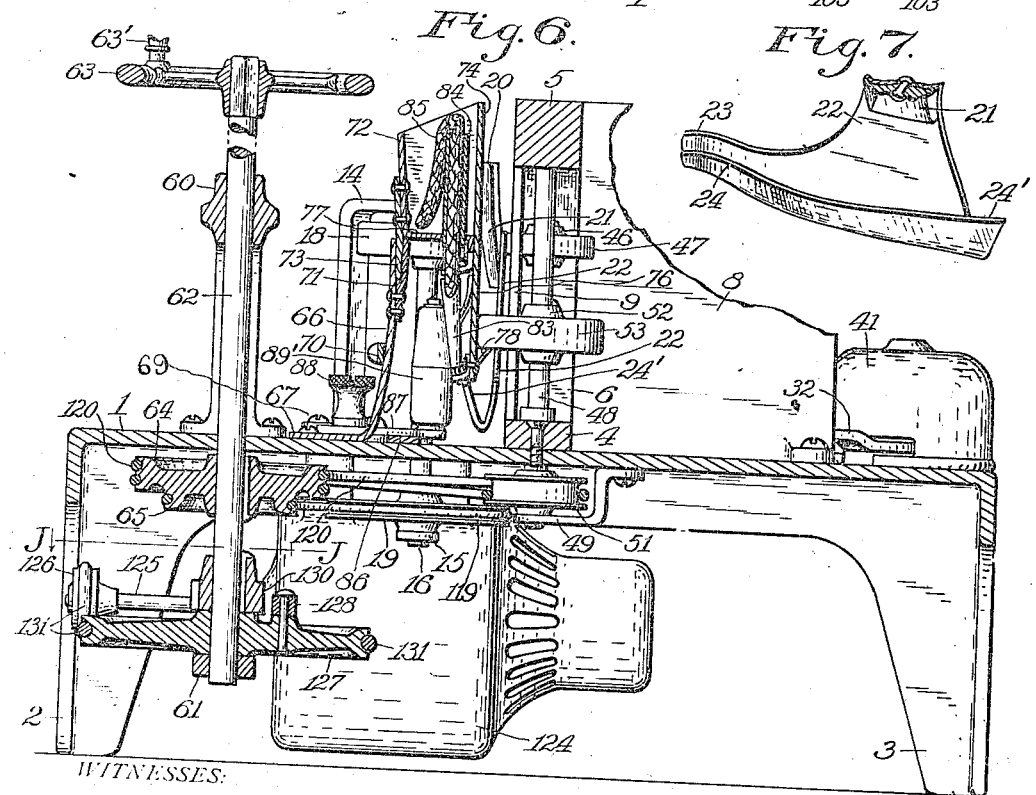

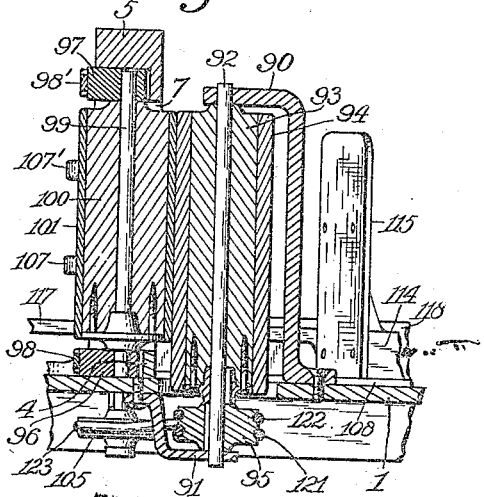
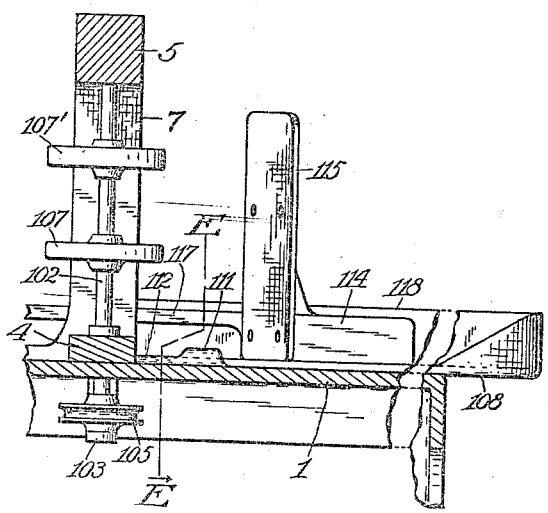
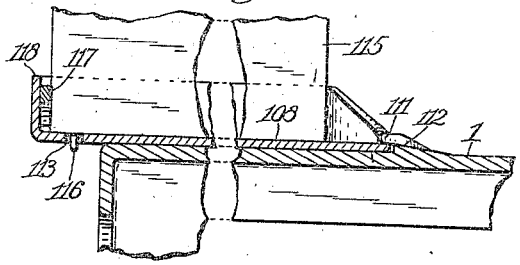
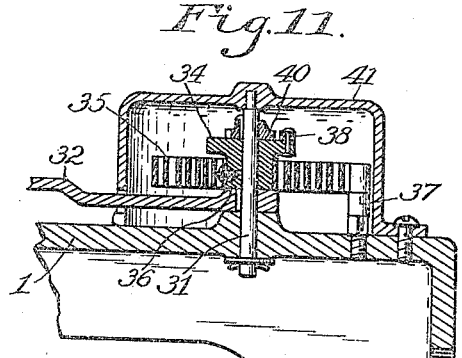
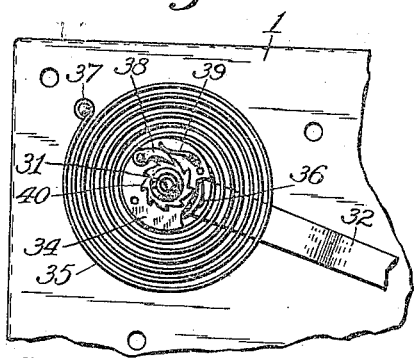
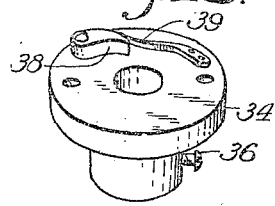
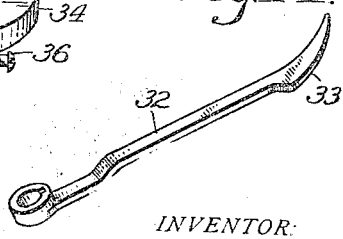

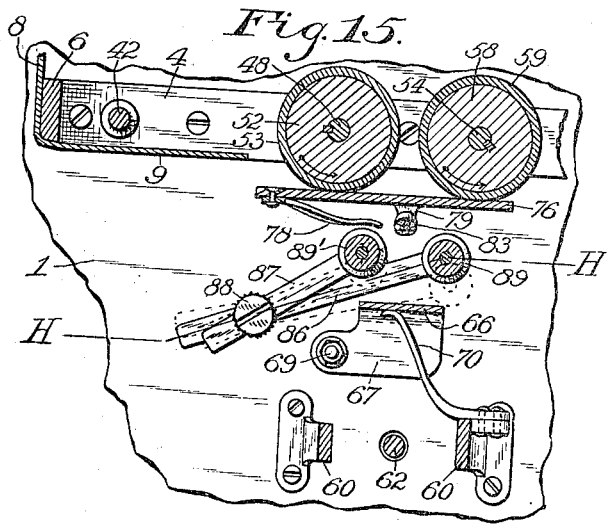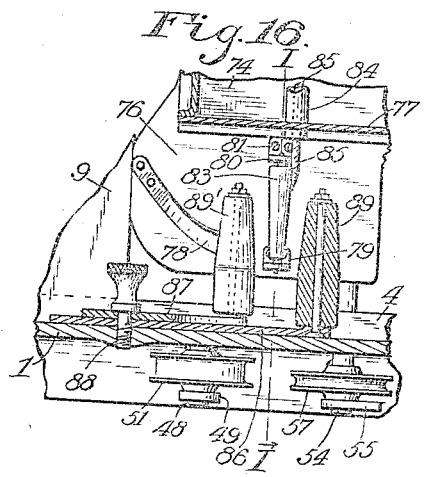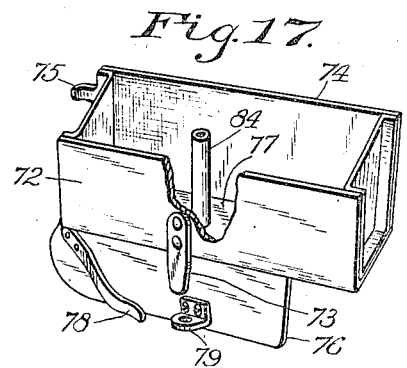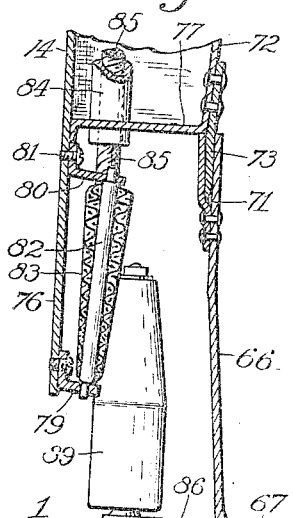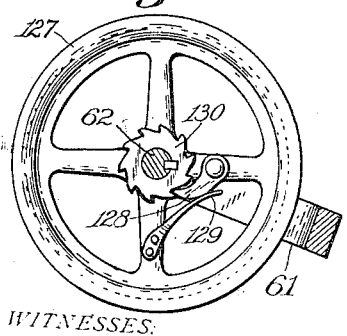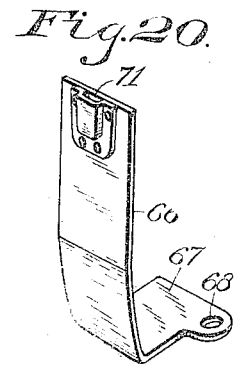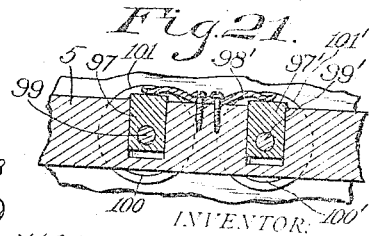

WILLIAM A. SHOULTS, OF INDIANAPOLIS, INDIANA.

ENVELOP MOISTENER AND SEALER.

1,043,366.  Specification of Letters Patent.  Patented Nov. 5, 1912.

Application filed April 10, 1911.  Serial No. 619,983.

*To all whom it may concern:*

Be it known that I, WILLIAM A. SHOULTS, a citizen of the United States, residing at Indianapolis, in the county of Marion and State of Indiana, have invented a new and useful Envelop Moistener and Sealer, of which the following is a specification, reference being had to the accompanying drawings, and to the letters and figures of reference marked thereon.

This invention relates to machines that are adapted to be used in business offices or elsewhere for moistening the adhesive substance on envelops, and also for sealing the envelops, the invention having reference particularly to the general construction as well as various details in moistening and sealing machines.

The object of the invention is to provide a machine of the above mentioned character that will be composed of relatively few and simple elements, that may be cheaply constructed, and to provide a moistener and sealer that will be adapted to seal envelops of various sizes and capable of being operated either by hand or other power and be efficient, rapid, and also durable and economical in use.

The invention comprises principally improved moistening apparatus and also novel apparatus for moving the envelops to and from the moistening apparatus, and the invention consists further in the parts, and combinations and arrangements of parts, as hereinafter particularly described and claimed.

Referring to the drawings, Figure 1 is a top plan of the improved moistener and sealer; Fig. 2, a front elevation; Fig. 3, an inverted plan; Fig. 4, a rear elevation partially broken away; Fig. 5, a fragmentary vertical section on the plane of the line A A in Fig. 1; Fig. 6, a transverse section on the line B B in Fig. 1; Fig. 7, a perspective view of a device for laying over the flap to be moistened; Fig. 8, a fragmentary section on the line C C in Fig. 1; Fig. 9, a fragmentary section on the line D D in Fig. 1; Fig. 10, a fragmentary section on the line E E in Fig. 9; Fig. 11, a fragmentary section on the line F F in Fig. 1; Fig. 12, a fragmentary plan showing the devices for feeding the envelops; Fig. 13, a perspective view of one of the parts of the feeding apparatus; Fig. 14, a perspective view of the arm comprising a part of the feeding apparatus; Fig. 15, a fragmentary section on the line G G in Fig. 2; Fig. 16, a fragmentary section on the line H H in Fig. 15; Fig. 17, a perspective view of the water font comprising part of the moistening apparatus; Fig. 18, a fragmentary section on the line I I in Fig. 16; Fig. 19, a fragmentary section on the line J J in Fig. 6; Fig. 20, a perspective view of the stand for supporting the font; and Fig. 21, a fragmentary section on the line K K in Fig. 2.

Similar reference characters in the different figures of the drawings indicate corresponding elements or features of construction herein referred to.

A practical embodiment of the invention comprises a suitable table 1 which preferably is metallic so as to be sufficiently heavy to hold it steadily when in use, the table being oblong in plan and provided at its corners with front supporting legs 2 and 2' and rear supporting legs 3 and 3'. The table has an upright frame thereon preferably comprising a sill 4, a top rail 5, and end posts 6 and 7 supporting the rail. The sill and rail extend longitudinally so as to assist in guiding the envelop. A guide-plate 8 is connected to one end of the frame and extends rearwardly approximately at right angles to the frame and has a guide plate 9 formed integrally therewith which is secured to the forward side of the sill 4 and rail 5 for assisting to guide the envelops to the moistening apparatus. The plate 9 has an aperture 10 therein relatively near the plate 8. A stop frame comprises a horizontal member 11 and a post 12, the latter being secured upon the top of the table 1 slightly forward of the plane of the rail 5. The member 11 has a guide rib 13 on its rear side against which the envelop may freely move. A frame member 14 is secured upon the table near the forward end of the plate 8 and the table is provided with a shaft bearing 15, a shaft 16 being rotatably mounted vertically in the shaft bearing 15 and the frame member 14 and has a wheel 17 fixed thereon which is provided with a rubber band 18, or the wheel is so constructed as to be adapted to move the envelop without being liable to slip in contact therewith, the wheel being arranged at a suitable height so as to not interfere with the flap of the envelop. A grooved pulley 19 is secured to the lower portion of the shaft 16 below the under side of the table. A spring arm 20 is secured to the frame member 11 and extends horizontally past the forward end of the guide plate 8 and opposite the front of the plate 9, and it has a projection 21 thereon extending downwardly to which a guide plate 22 is secured, the latter extending downward and having a finger 23 thereon that extends approximately toward the post 12 for causing the flap of the envelop to be separated from the back of the envelop. The lower portion of the plate 22 and the finger is turned up to form a flange 24, a portion of which is doubled over against the end of the finger 23 to constitute a portion thereof, the metal of which this is composed being quite thin, and the opposite end portion 24′ is flared outward from the plate 22, so as to spread the flap from the envelop, as the latter moves toward the moistening apparatus.

The table 1 has a guide slot 25 in the rearward portion thereof extending in a plane between the plate 8 and the post 12, and a feed head comprises a base plate 26 and an upright plate 27, the base plate being slidable upon the table above the slot and having a guide rib 28 thereon extending movably into the slot and adapted to be moved slightly in lateral direction, so that the upright plate 27 shall not be guided rigidly. The base plate has a knob 29 thereon whereby the feed head may be retracted by hand. Preferably the table has guide ribs 30 and 30′ thereon on which the base plate may slide to move the plate 27 toward or from the rib 13 and the wheel 17. At the rearward portion of the head end of the table a shaft 31 is rotatably mounted in the table and has an arm 32 secured thereto which extends over to the rear side of the plate 27 and has a curved bearing end 33 presenting a convex face against the rear side of the upright plate and in sliding contact therewith. A collar 34 is rotatable on the shaft 31. The inner end of a volute spring 35 is secured to the collar by means of a lug 36, and the outer end of the spring is secured to the table by means of a post 37. A dog 38 is pivotally mounted upon the collar and provided with a spring 39 which normally forces the dog into contact with a ratchet wheel 40 which is secured to the shaft 31. The spring is so strained as to force the arm forwardly in order to advance the feed-head and the tension of the spring may be adjusted by rotating the collar 34 by means of a suitable tool in the desired direction on the shaft 31 and then permitting the dog and ratchet wheel to hold the collar in the adjusted position. A suitable casing 41 is placed over the spring and secured to the table 1, the shaft 31 preferably having its upper end journaled in the top of the casing.

Suitable provision is made for preventing two or more envelops from being moved together to the moistening apparatus in case the one being moved drags another with it, and in order to accomplish this a shaft 42 is mounted at its lower end in a shaft bearing 43 and at its upper end in a journal bearing 44 formed in the rail 5, the lower portion of the shaft having a grooved pulley 45 fixed thereon below the under side of the table. A wheel 46 is fixed on the shaft relatively near the rail 5 and has a flexible band 47 thereon adapted to prevent the wheel from slipping against the envelop, the wheel being partially in the aperture 10 and is intended to push back any envelops that may be dragged with the foremost envelop toward the moistening apparatus.

Another shaft 48 is mounted rotatably at its lower end in the shaft hanger 49 secured to the table and at its upper end in a journal bearing 50 in the rail 5, a grooved pulley 51 being fixed on the lower portion of the shaft, the groove in the pulley being relatively broad so as to accommodate two round belts. A wheel 52 is fixed on the shaft relatively close to the sill 4 and it has a flexible band 52 thereon. A similar shaft 54 is rotatively mounted at its lower end in a shaft bearing 55 secured to the table and at its upper end in a journal box 56 in the rail 5, a grooved pulley 57 being fixed on the lower portion of the shaft. A wheel 58 is secured to the shaft in the plane of the wheel 52 and has a flexible band 59 thereon.

A shaft stand 60 is mounted upon the top of the table 1 near the forward portion thereof and opposite the shafts 48 and 54, a shaft bearing 61 being mounted on the under side of the table below the stand, and an operating shaft 62 is journaled at its lower end in the shaft bearing 61 and at its upper portion in the stand 60, the shaft extending above the stand and having a hand wheel 63 fixed thereon and provided with a handle 63′ serving as a crank. A double grooved pulley 64 is fixed on a shaft 62 below the under side of the table and the pulley has a relatively smaller grooved pulley 65 thereon, the two pulleys preferably being formed integrally, although not necessarily so.

A suitable stand 66 is provided which has a base plate 67 supported upon the top of the table 1 and provided at one end thereof with a pivot-hole 68 receiving a pivot 69 connected to the table, so that the stand may have a slight movement toward or from the wheels 52 and 58, the stand being normally pressed toward the wheels by means of a spring 70 in contact therewith and supported on the stand 60. The upper portion of the stand 66 is provided with a socket 71. A suitable font is provided, the forward side 72 of which has a dowel 73 thereon which is inserted removably in the socket 71, the rear side 74 of the font preferably having a curved guide finger 75 thereon which extends approximately toward the shaft 16. The rear side 74 has also a guide plate 76 thereon extending downwardly toward the table beyond the bottom 77 of the font, and the guide plate has a guide finger 78 mounted thereon which extends approximately toward the table and the tail end of the machine for guiding the flap of the envelop away from the guide-plate 76, it being intended that the envelop shall pass between the guide plate 76 and the wheels 52 and 58.

A shaft bearing 79 is mounted on the lower portion of the guide plate 76 and a shaft bearing 80 is mounted on the upper portion of the plate 76 below the bottom of the font, preferably by means of screws 81 so as to be removable, and a shaft 82 is mounted rotatably in the shaft bearings at an inclined angle, the shaft having a suitable cover 83 thereon of sponge like consistency, such as felt, for moistening the adhesive substance, the upper portion preferably being thicker than the lower portion, so as to constitute a conical sponging roll with the larger end uppermost. A tube 84 is secured to the bottom 77 of the font and extends downwardly therethrough and also upward approximately as high as the top of the font. A feed wick 85 is placed in the tube and extends downward against the upper end of the sponging roll and also extends over the top of the tube and down approximately to the bottom of the font, so as to feed water by capillary attraction and permit the water to flow down by gravity through the tube. An arm 86 normally rests on the top of the table rearward of the stand 66, a shorter arm 87 being supported upon the arm 86, and both arms are secured to the table by means of an adjusting screw 88 permitting the arms to be adjusted. A roller 89 is mounted rotatably in upright position upon the arm 86 and a similar roller 89' is mounted upon the arm 87, the rollers being opposite the guide-plate 76 and at opposite sides of the plane of the sponging roll so as to hold the flap of the envelop closely against the sponging roll. The rollers 89 and 89' preferably are conical in order to correspond to the inclination of the sponging roll or approximately so.

Farther along toward the tail end of the table a shaft frame 90 and preferably a similar frame 90' are fixedly mounted upon the top of the table 1, shaft bearings 91 and 91' being secured to the under side of the table. The machine is provided with a pair of pressure rolls for sealing the envelops and preferably two pairs of pressure rolls are provided as illustrated, one roll of each pair being non-adjustable and preferably comprising shafts 92 and 92' rotatably mounted at the lower ends in the shaft supports 91 and 91', respectively, and at the upper ends in the shaft frames 90 and 90', respectively. Rollers 93 and 93' are secured to the shafts and have suitable covers 94 and 94' thereon, respectively, adapted to adhere slightly to the envelops and to be yielding in character. The lower portions of the shafts have double grooved pulleys 95 and 95' fixed thereon, respectively. The opposite rolls of the pairs are mounted in the upright frame, and journal boxes 96 and 96' are mounted movably in the sill 4, journal boxes 97 and 97' being mounted movably in the rail 5, the journal boxes being forced toward the shafts 92 and 92' by means of springs 98 and 98', respectively, and rotatably support shafts 99 and 99' on which are rollers 100 and 100' provided with yielding covers 101 and 101', respectively, opposing the yielding covers 94 and 94', so as to firmly press the moistened flaps against the envelops while moving the latter toward the tail end of the machine. Another shaft 102 is mounted at a suitable distance beyond the pressure rolls toward the tail end of the machine, and supported in a shaft bearing 103 secured to the table and in a journal bearing 104 in the rail 5, the lower portion of the shaft having a grooved pulley 105 fixed thereon. A wheel 106 is fixed to the shaft above the sill 4 and it has a flexible rim 107 thereon. Preferably another wheel 106' having a flexible rim 107' is fixed also to the shaft above the wheel 106, the wheels being adapted to move the envelops away from the pressure rolls.

The tail end portion of the table is suitably adapted to receive the sealed envelops and preferably has a tray 108 supported removably upon the table, the tray having a projection 109 on its under side that extends into a slot 110 formed in the table. One edge of the tray is inserted under a finger 111 on the top of the table and frictionally held thereby. The table has an incline 112 adjacent the sill 4, for raising the envelops onto the tray. The terminal end portion of the tray has a transverse slot 113 therein, and an abutment 114 of suitable weight is provided and has an upright back plate 115 against which the envelops may be packed, the abutment being arranged obliquely on the tray and provided with a projection 116 that extends into the groove 113 for guiding the abutment forwardly on the tray. The abutment has a stop bar 117 thereon which extends toward the rear side of the table for stopping the envelops evenly. The stop bar slides against the upright end 118 of the tray whereby the abutment is partially guided.

In order to actuate the different shafts in harmony by means of the operating shaft 62 a belt 119 embraces the pulleys 19 and 65; another belt 120 extends about the pulley 45 and in one of the grooves of the pulley 64 and also over the pulley 51 and about the pulley 57; another belt 121 embracing the pulley 95 and extending into the other groove of the pulley 64; a belt 122 embracing the pulleys 95 and 95', and another belt 123 is crossed and connects the pulley 105 with the pulley 95'. It will be understood, however, that if one pair of pressing rollers only is employed the belt 123 would be connected with the pulley 95.

Preferably a suitable electric motor 124 is secured to the under side of the head end portion of the table, the motor having a main shaft 125 provided with a small pulley 126. A relatively large pulley 127 is mounted rotatably on the shaft 62 and has a dog 128 pivoted thereon and also a spring 129 forcing the dog into contact with the ratchet wheel 130 secured to the shaft, the pulleys 126 and 127 being operatively connected by means of a belt 131. The arrangement is such, as will be seen, that the operating shaft 62 may be turned by hand without moving the pulley 127 and permitting the motor to remain at rest, the pulley 127, however, being turned so as to rotate the shaft when the motor is running in the predetermined direction.

Medium sized envelops 132 extend from the guide plate 8 to the rib 13, and it will be understood that the official sizes of envelops will extend beyond the rib 13 toward the head end of the machine. Sufficient space is provided between the pressing rolls and the stop-bar 117 to receive the larger envelops, and the wheel 106 and the stop-bar 117 are suitably spaced apart so that the medium size of envelop shall be moved by the wheel until stopped by the stop-bar, 132' indicating the sealed envelops at the terminal end of the machine, each envelop having a common type of flap 133.

As seen particularly in Fig. 5 the shafts 42, 48, 54 and 102 extend through the sill 4, and it is obvious that they may be journaled therein and the shaft bearings 43, 49, 55 and 103 dispensed with if desired; and it will be understood also that various other modifications in the details of construction may fairly be made within the scope of the appended claims.

In practical use the envelops are placed head down on the table with flaps forward, the feed head being retracted by hand to receive the envelops between the upright plate 27 and the rim 18 and rib 13. The operating shaft 62 is rotated so that the rim 18 draws the foremost envelop over against the guide plate 9 and the spring arm 20, the envelop passing behind the plate 22 while the finger 23 forces the flap of the envelop forward so that it passes forward of the finger 78 and between the sponging roll and the rolls 89' and 89, so that the mucilage or gum becomes moistened, the envelop being moved by the rims 53 and 59 to the pressing rolls which press down the flap while the envelop passes between the rolls and is pushed along between the plate 115 and the wheel 106 which moves the envelops to their destination on the tray, and it will be observed that as shown in Fig. 1 the angle in which the plate 115 is set leaves the trailing end of the envelop projecting away from the plane of the sill 4, so that the next succeeding envelop will readily pass from the pressing rolls between the preceding envelop and the wheel 106 or 106' to be forced along thereby, the envelops thus packed against the abutment causing the abutment to move forward. Minor results of operation of the machine will be readily understood from a perusal of description of construction of the several parts and functions thereof without further explanation.

Having thus described the invention, what is claimed as new, is—

1. An envelop moistener including a supported guide plate, a feed wheel rotatable at one side of the guide plate, a moistening roll rotatably mounted on the opposite side of the guide plate, and two guide rolls mounted also on the opposite side of the guide plate in a plane beyond the axis of the moistening roll and acting adjacent to and in conjunction with the moistening roll.

2. An envelop moistener including a supported guide plate, a feed roll rotatable at one side of the guide plate, a tapering moistening roll rotatably mounted on the opposite side of the guide plate with its larger end uppermost and a guide finger supported also on the opposite side of the guide plate and extending downwardly and also outwardly therefrom and toward the portion of the moistening roll that is farthermost from the guide plate.

3. An envelop moistener including a guide plate, two feed rolls rotatable at one side of the guide plate, means for holding the guide plate yieldingly against the feed rolls, a moistening roll rotatably and removably mounted on the opposite side of the guide plate, and two guide rolls mounted adjustably also on the opposite side of the guide plate in a plane beyond the axis of the moistening roll and acting adjacent to and in conjunction with the moistening roll.

4. An envelop moistener including an uprightly supported guide plate, a feed roll rotatable at one side of the guide plate, a moistening roll rotatably mounted at an inclined angle on the opposite side of the guide plate, the upper end of the roll being farther than the lower end thereof from the plate, and two tapering guide rolls rotatably supported in a plane beyond the axis of the moistening roll from the guide plate, the smaller ends of the guide rolls being uppermost, the two rolls acting adjacent to and in conjunction with the moistening roll.

5. An envelop moistener including a table, a stand having a base plate pivotally mounted on the table, a font mounted on the stand and having a guide plate thereon, a pair of feed rolls mounted on the table at the farther side of the guide plate from the stand, a spring supported substantially on the table and pressing the stand toward the feed rolls, a moistening roll rotatably mounted on the guide plate at the farther side thereof from the feed rolls, and a feeder extending from the font to the moistening roll.

6. An envelop moistener and sealer including a font, a moistening roll rotatably mounted below the font, means for feeding liquid from the font to the moistening roll, a movable feed head, guiding means opposed to the feed head, feed wheels for moving the envelop from the guiding means to the moistening roll, a guide plate for guiding the envelop behind the font, a guide for guiding the flap of the envelop forward of the guide plate to the farther side of the moistening roll, and a pair of pressing rolls mounted beyond the moistening rolls.

7. An envelop moistener including a table, a stand and an upright frame mounted oppositely upon the table, a feed wheel rotatably mounted in the frame, a guide roll mounted on the table approximately opposite the feed wheel, a font mounted on the stand and having a downward extending guide plate thereon supported adjacent to the feed wheel, a moistening roll rotatably mounted on the farther side of the guide plate from the feed wheel and in proximity to the guide roll to act in conjunction with the latter, and a guide finger mounted on the guide plate and extending therefrom approximately to the moistening roll.

8. An envelop moistener including a table, a stand and an upright frame mounted oppositely upon the table, two feed wheels mounted in the frame, two guide rolls mounted on the table substantially opposite the feed wheels, a font removably mounted on the stand and having a guide plate thereon extending opposite the feed wheels, a moistening roll rotatably mounted on the guide plate between the plate and the plane of the axes of the guide rolls and adjacently to the guide rolls to act in conjunction therewith, and a guide finger mounted on the guide plate and extending toward the plane between the axis of the moistening roll and the axes of the guide rolls.

9. An envelop moistener including a table, a stand mounted on the table, a font mounted on the stand and having a tube connected to the bottom thereof and extending upward in the font, a guide plate connected to the font and having two shaft bearings thereon, a shaft rotatably mounted in the bearings and having an absorbent covering thereon, a guide finger on the guide plate extending therefrom toward the farther side of the shaft covering, a feed wick in the tube extending to the absorbent covering and also over the top of the tube toward the bottom of the font, and guiding devices mounted on the table opposite the guide plate.

10. An envelop moistener including a pair of rotatable feed wheels, a stand adjustably mounted opposite the plane of the axes of the wheels, a spring suitably supported and forcing the stand toward the wheels, a font mounted on the stand, a guide plate extending downward from the font and supported thereby against the feed wheels, a moistening roll mounted opposite the guide plate at the farther side thereof from the feed wheels, a pair of guide rolls mounted in a plane on the side of the guide plate at which the moistening roll is mounted and beyond the axis of the moistening roll, and a guide finger extending from the guide plate toward the plane between the axes of the guide rolls and the moistening roll.

11. An envelop moistener and sealer including a table, an upright frame on the table having a longitudinal guide plate on one end portion thereof, a stop frame mounted on the table beyond the end portion of the frame, a spring-arm mounted on the stop frame and extending opposite the longitudinal guide plate, the spring arm having a guide plate thereon provided with a projecting finger and also a flaring flange extending from the finger adjacent the longitudinal guide plate, a feed wheel mounted on the table, a moistening roll rotatably mounted on the table beyond the end of the spring arm.

12. An envelop moistener and sealer including an oblong table having an upright frame thereon extending longitudinally thereof, a feed wheel and a moistening roll rotatably mounted beyond the plane of one side of the frame, two feed wheels mounted in the frame, a guide plate mounted yieldingly against the two feed wheels, a moistening roll mounted on the guide plate, a guide finger extending from the guide plate toward the farther side of the moistening roll, means for conducting liquid to the moistening roll, a pressing roll rotatably mounted upon the table opposite the plane of the frame, and a pressing roll rotatably mounted adjustably in the frame.

13. An envelop moistener and sealer including a table, a moistening roll and a font and also pressing rolls mounted on the table, a plurality of feed rolls mounted on the table to move the envelop, a backing wheel rotatably mounted near one of the feed wheels, an operating shaft mounted on the table, a dual pulley secured to the operating shaft, drive pulleys for the feed rolls and the backing roll, one for each and operatively connected therewith, belts connecting the drive pulleys with the dual pulley, a power-pulley rotative on the operating shaft and having a dog thereon, a ratchet wheel secured to the operating shaft and engaged by the dog, a motor mounted on the table, a belt connected with the motor and the power-pulley, and a crank connected to the operating shaft.

In testimony whereof, I affix my signature in presence of two witnesses.

WILLIAM A. SHOULTS.

Witnesses:
P. A. HAVELICK,
E. T. SILVIUS.